US012665361B2

(12) United States Patent
Zimmerman et al.

(10) Patent No.: US 12,665,361 B2
(45) Date of Patent: Jun. 23, 2026

(54) MULTI-PIN NETWORK CABLE CONNECTOR

(71) Applicant: Cisco Technology, Inc., San Jose, CA (US)

(72) Inventors: George Allan Zimmerman, Manhattan Beach, CA (US); Chad M. Jones, Doylestown, OH (US); Jason Dewayne Potterf, Austin, TX (US); Joel Richard Goergen, Soulsbyville, CA (US); Elizabeth Kochuparambil, Morgan Hill, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 356 days.

(21) Appl. No.: 18/360,304

(22) Filed: Jul. 27, 2023

(65) Prior Publication Data

US 2025/0038462 A1    Jan. 30, 2025

(51) Int. Cl.
*H01R 24/64* (2011.01)
*H01R 107/00* (2006.01)
*H04L 12/10* (2006.01)

(52) U.S. Cl.
CPC ............. *H01R 24/64* (2013.01); *H04L 12/10* (2013.01); *H01R 2107/00* (2013.01); *H01R 2201/04* (2013.01)

(58) Field of Classification Search
CPC ........................... H01R 24/64; H01R 2107/00; H01R 2201/04; H04L 12/10
USPC .......................................... 439/660, 498, 502
See application file for complete search history.

(56) References Cited

U.S. PATENT DOCUMENTS

| | | | | |
|---|---|---|---|---|
| 8,517,766 B2 * | 8/2013 | Golko | ............... | H04L 12/40078 |
| | | | | 439/607.41 |
| 8,764,478 B2 * | 7/2014 | Lin | ...................... | H01R 13/665 |
| | | | | 439/498 |
| 8,936,484 B2 * | 1/2015 | Metzler | .............. | H01R 13/5221 |
| | | | | 439/569 |
| 9,039,443 B2 * | 5/2015 | Rostami | ................. | H01R 24/28 |
| | | | | 439/502 |
| 10,879,657 B2 * | 12/2020 | Tsai | ...................... | H01R 13/642 |
| 2007/0260904 A1 | 11/2007 | Camagna et al. | | |
| 2010/0100750 A1 | 4/2010 | Bobrek | | |
| 2011/0217873 A1 | 9/2011 | Diab et al. | | |
| 2012/0190241 A1 * | 7/2012 | Chang | ................ | H01R 13/6675 |
| | | | | 439/620.23 |
| 2014/0103707 A1 | 4/2014 | Maymon et al. | | |
| 2016/0154446 A1 | 6/2016 | Mullins et al. | | |
| 2016/0352055 A1 * | 12/2016 | Jaussi | ................ | H01R 13/6658 |

(Continued)

*Primary Examiner* — Gary F Paumen
(74) *Attorney, Agent, or Firm* — Edell, Shapiro & Finnan, LLC

(57) ABSTRACT

Presented herein are techniques for connectors, apparatuses, and system with connectors for data and power. A connector at an end of the network cable can be configured to mate with a port in a device. The connector can include a set of data pins for connecting data wires in the network cable to the port. The connector can include a set of power pins for connecting power wires in the network cable to the port. The set of power pins can carry a higher electrical power than that carried by the set of data pins. A first spacing between adjacent power pins in the set of power pins has at least a minimum distance to reduce voltage breakdown between the adjacent power pins in the set of power pin.

28 Claims, 11 Drawing Sheets

(56) References Cited

U.S. PATENT DOCUMENTS

| | | |
|---|---|---|
| 2020/0278402 A1 | 9/2020 | Goergen et al. |
| 2022/0190528 A1 | 6/2022 | Arduini et al. |
| 2023/0221380 A1* | 7/2023 | Shea ........................ H02H 5/12 |
| | | 361/42 |

* cited by examiner

MULTI-PIN NETWORK CABLE CONNECTOR

TECHNICAL FIELD

The present disclosure relates to connectors for network cables with multiple pins to carry data and/or power. The connectors can be used in conjunction with network devices.

BACKGROUND

Computer and network devices can communicate with each other over a network. Such devices can be connected to one another via network cables. The network cables can be a hard line connection between the devices and can form a network such as a Local Area Network (LAN). Ethernet is a family of wired computing networking technologies commonly used for LAN connectivity.

DESCRIPTION OF EXAMPLE EMBODIMENTS

Overview

Presented herein are connectors as well as apparatuses and systems with connectors that can have multiple pins to carry data and/or power between devices over a network. According to one aspect, a connector is configured to be deployed at an end of a network cable. The connector includes a set of data pins for connecting data wires in the network cable to a port of a device. The connector further includes a set of power pins for connecting power wires in the network cable to the port. The set of power pins are configured to carry a higher electrical power than that carried by the set of data pins. In accordance with one aspect, a first spacing between adjacent power pins in the set of power pins has at least a minimum distance to reduce voltage breakdown between the adjacent power pins in the set of power pins.

Example Embodiments

Techniques are presented herein for connectors with pins that carry electrical power and pins that carry data. The connectors are for use with a network cable that connects devices over a network. High voltage or high wattage electrical power carried over the power pins of a connector can cause voltage breakdown between one another and can potentially cause interference with data signals carried by the data pins of the connector. The techniques presented herein provide a minimum distance for spacing between adjacent power pins in a set of power pins in the connector to avoid voltage breakdown that can be caused by the electrical power carried by the power pins. In one example, the power pins can be placed in the "shoulder" of the connector, towards a first surface of the connector, while the data pins are placed towards a second surface of the connector opposite of the first surface. In one example, electrical power over the power pins can be controlled remotely via techniques, referred to herein as Fault Managed Power (FMP) techniques.

Figure 1A:
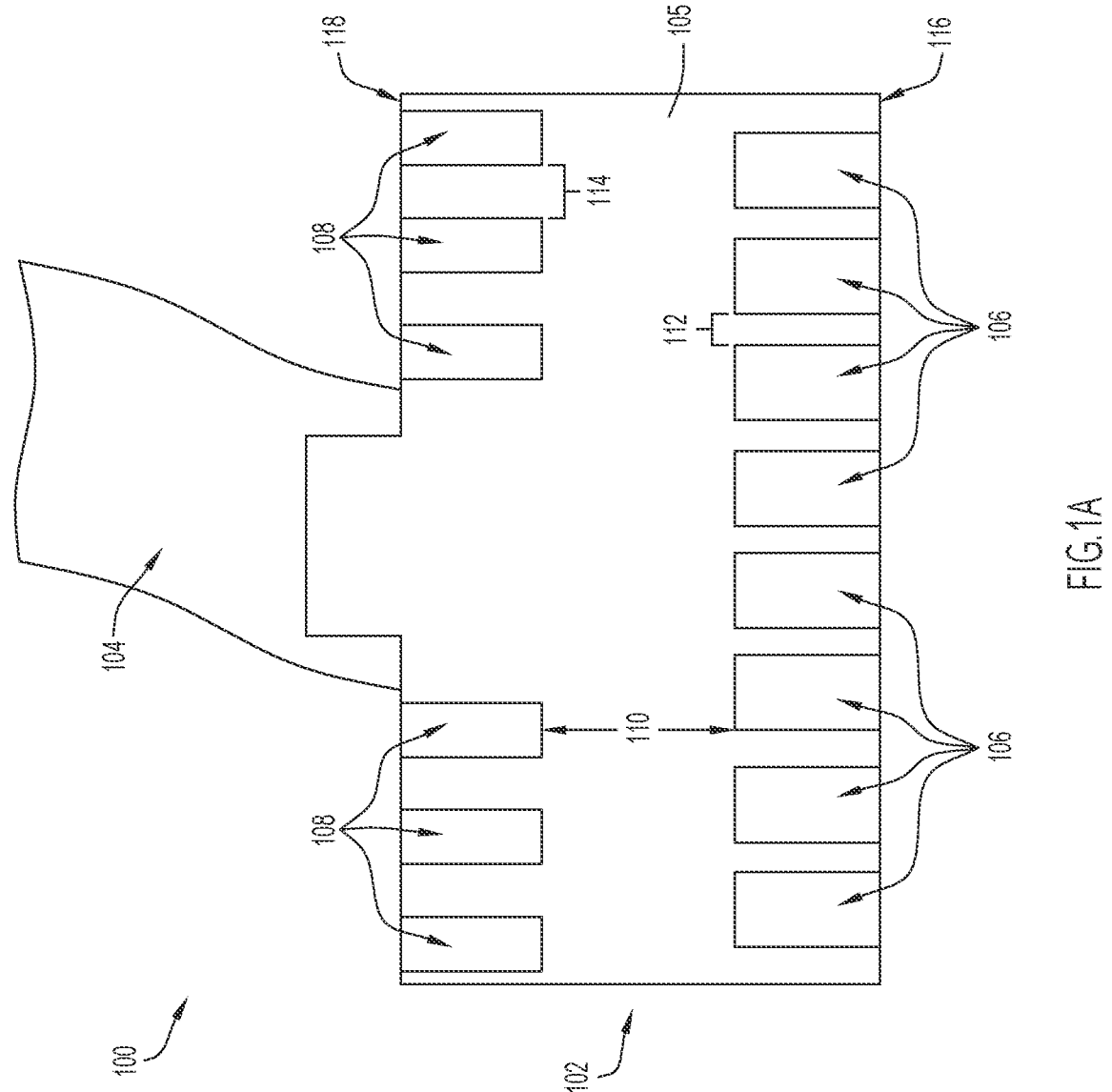
FIG. 1A is a block diagram of an example apparatus that includes a connector and a network cable, according to an example embodiment.

FIG. 1A shows an example apparatus 100 that includes a connector 102 and a network cable 104. The connector 102 comprises a connector housing 105, and has a set of data pins 106 and a set of power pins 108 within the connector housing 105. The set of data pins 106 can carry data signals between devices connected over a network via the network cable 104. The set of data pins 106 can carry data, or data and electrical power. The data can be sent over the set of data pins 106 using electrical signals. The set of power pins 108 can carry electrical power over the network cable 104 from a power transmitter to a device, as described in more detail below. The electrical power carried by the set of power pins 108 can have a higher voltage or higher wattage than electrical power and/or electrical signals carried over the set of data pins 106. The higher voltage or wattage carried by the set of power pins 108 has the potential to cause voltage breakdown between adjacent power pins of the set of power pins 108. The higher voltage or wattage carried by the set of power pins 108 also has the potential to cause electrical interference with the electrical signals for the data carried by the set of data pins 106. The degree to which the electrical interference from the higher power on the set of power pins 108 may impact signals on the set of data pins 106 depends upon the spacing between the set of data pins 106 and the set of power pins 108.

In one example, a first spacing 110 between the set of data pins 106 and the set of power pins 108 is greater than a second spacing 112 that is between the pins of the set of data pins 106. In other words, the first spacing 110 between any given power pin and any given data pin is greater than the greatest spacing between any one data pin. The first spacing 110 can be of sufficient distance such that the higher electrical power carried by the set of power pins 108, as compared to electrical power or data signals carried by the set of data pins 106, does not cause electrical interference with the data carried by the set of data pins 106.

In one example, a third spacing 114 between adjacent power pins of the set of power pins 108 can be at least a minimum distance to prevent voltage breakdown between the adjacent power pins. The third spacing 114 can be greater than the second spacing 112 that is between adjacent data pins of the set of data pins 106. The third spacing 114 can be uniform between each of the adjacent power pins of the set of power pins 108 or can vary. In one example, the minimum distance for the third spacing 114 can be based on a ratio of 1 mm of spacing per a kilovolt of electrical power carried over the power pins to prevent voltage breakdown. In one example, if 15 kilovolts of electrical power are carried by the power pins then 15 millimeters of spacing can be employed between adjacent power pins to provide the minimum distance to prevent voltage breakdown.

In one example, the connector 102 is an Ethernet connector. In one example, the connector 102 has a form factor that is the same form factor as a Register Jack 45 (RJ45) connector, but with the aforementioned different pin spacings, and possibly different number of pins, than a standard RJ45 connector. It should be appreciated that the connector 102 is not limited to any one form factor. An embodiment of the technology described herein with the set of data pins 106 and the set of power pins 108 with the first spacing 110 that also uses the form factor RJ45 can be described as an augmented RJ45 connector.

The set of data pins 106 can include any number of data pins. In the example depicted for apparatus 100, the set of data pins 106 includes 8 data pins. The data pins of the set of data pins 106 can be an even number with any two pins of the set of data pins 106 forming a pair of pins for sending and receiving data and/or power. The set of data pins 106 that can carry power and electrical power can support Power over Ethernet (PoE). In one example, the set of data pins 106 carry data signals and do not carry electrical power to a device, while the set of power pins 108 are relied upon to carry electrical power. The set of power pins 108 can carry power that is managed using Fault Managed Power (FMP) techniques. In one example, the network cable 104 with the connector 102 can simultaneously support PoE and FMP to deliver power and manage power to a device without the need to alternate between using PoE and FMP.

The set of power pins 108 can include any number of pins for carrying electrical power. In the example depicted for apparatus 100, the set of power pins 108 includes 6 power pins. In various examples, the set of power pins 108 can include 2 to 6 pins for carrying electrical power. The set of power pins 108 can include an even number of pins forming pairs where one pin of the pair carries positive power and one pin carries negative power, also known as power "send" and power "return". For example, in apparatus 100, the three pins of the set of power pins 108 on the left side of the connector 102 can carry positive power and can each be paired with one of the three pins on the left side of the connector 102 which carry negative power. In one example, the set of power pins 108 includes more than two pins but only a portion of the pins carry power while the other pins of the set of power pins 108 are not in use. For example, the set of power pins 108 can include six pins while two of the six pins carry electrical power for a period of time while the other four pins of the set of power pins 108 do not carry electrical power. Using a portion of the available pins of the set of power pins 108 to carry electrical power while the other pins are not used may be dependent upon the needs or capabilities of the device connected to the connector 102.

The set of power pins 108 can be configured to carry different levels of voltage or wattage of electrical power. For example, the set of power pins 108 can carry 800-4000 watts of electricity. In one example, the set of power pins 108 can carry multi-phase power.

The connector housing 105 has various regions, portions, and surfaces within or towards which the data pins and power pins may be located. For example, the set of data pins 106 can be located in a first portion of the connector housing 105 and be positioned along or towards a first surface 116 of the connector housing 105. Being positioned along the first surface 116 allows a portion of the pins of the set of data pins to be exposed and used to make contact with a port of a device. The first surface 116 can be referred to as a lower surface or bottom of the connector housing 105. The set of power pins 108 can be located in a second portion of the connector housing 105 along a second surface 118 of the connector housing 105. A portion of the pins of the set of power pins 108 can be exposed along the second surface 118 and configured to make contact with a port of a device. The second portion of the connector housing 105 along the second surface 118 can be referred to "shoulder" of the connector housing 105, and the second surface 118 can be referred to as the upper or top surface of the connector housing 105. In one example, the first surface 116 and second surface 118 of the connector housing 105 are opposite facing surfaces. By placing the set of data pins 106 along the first surface 116 and the set of power pins 108 along the second surface 118 of the connector 102, the third spacing 114 can be maximized to create sufficient distance between the adjacent power pins of the set of power pins 108 to avoid voltage breakdown between the adjacent power pins in the connector 102.

Figure 1B:
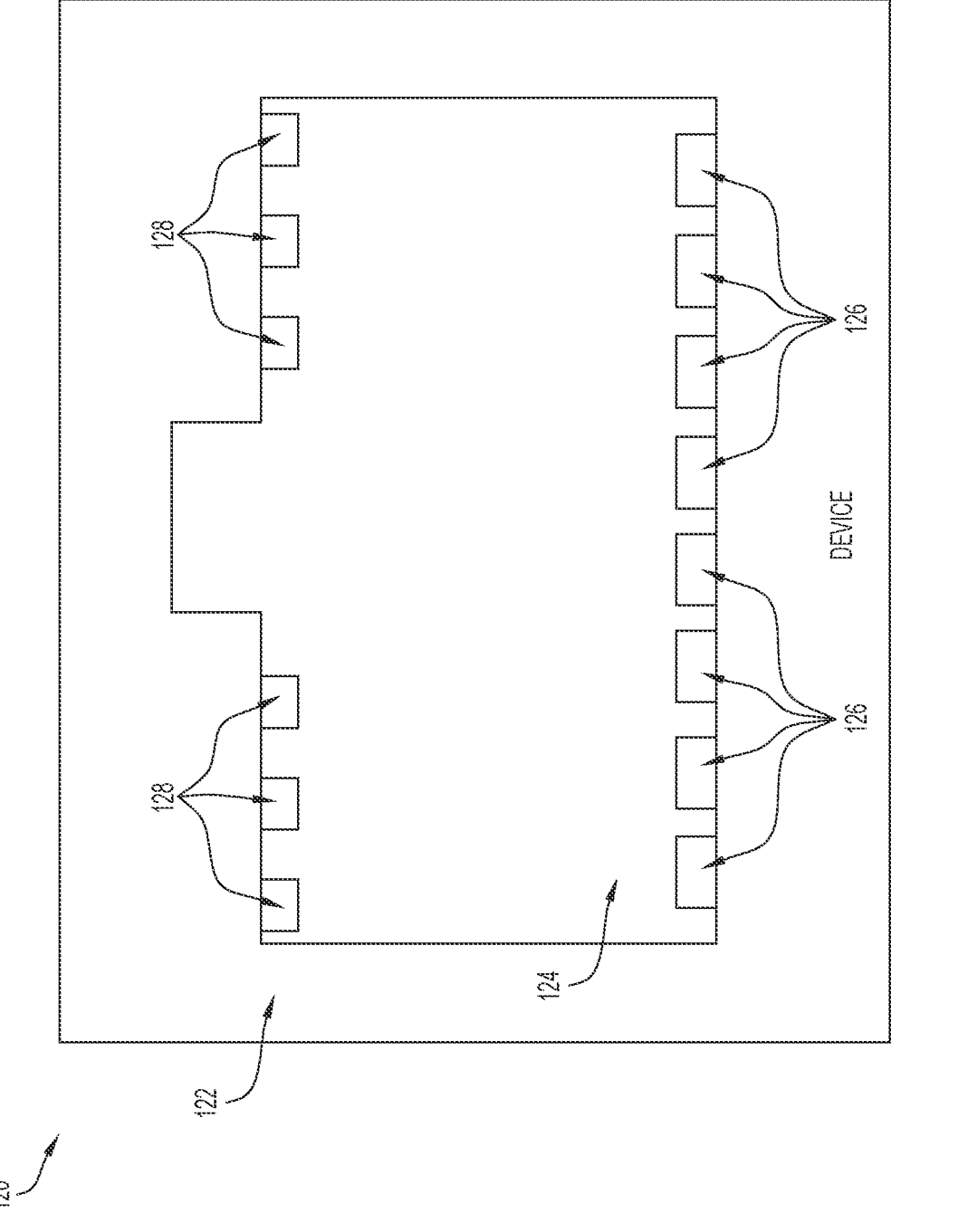
FIG. 1B is a block diagram of an example device with a port for the connector, according to an example embodiment.

FIG. 1B shows an example apparatus 120 that includes a device 122 with a port 124. The device 122 can be a device that is connected to a network via the connector 102 and the network cable 104 of apparatus 100 depicted in FIG. 1A. The device 122 can be any electrical or computing device that is capable of being connected to a network. For example, the device 122 can be a server computer, a blade computer, a switch, a top of rack (TOR) switch, a router, a network node, a desktop computer, a laptop computer, etc. The port 124 can be a network port configured to receive a connector located at the end of a network cable. For example, the port 124 can be an RJ45 port or an Ethernet port. The port 124 can include electrical contacts to mate and make contact with the pins of connector 102. For example, the port 124 can include a set of data contacts 126 that can make physical and electrical contact with the set of data pins 106 of the connector 102 such that the data signals carried by the set of data pins 106 can be received and/or transmitted by the set of data contacts 126. The port 124 can include a set of power contacts 128 that can make physical and electrical contact with the set of power pins 108 of the connector 102 that receive the electrical power carried by the set of power pins 108. The electrical power can then be used to power the device 122.

Figure 1C:
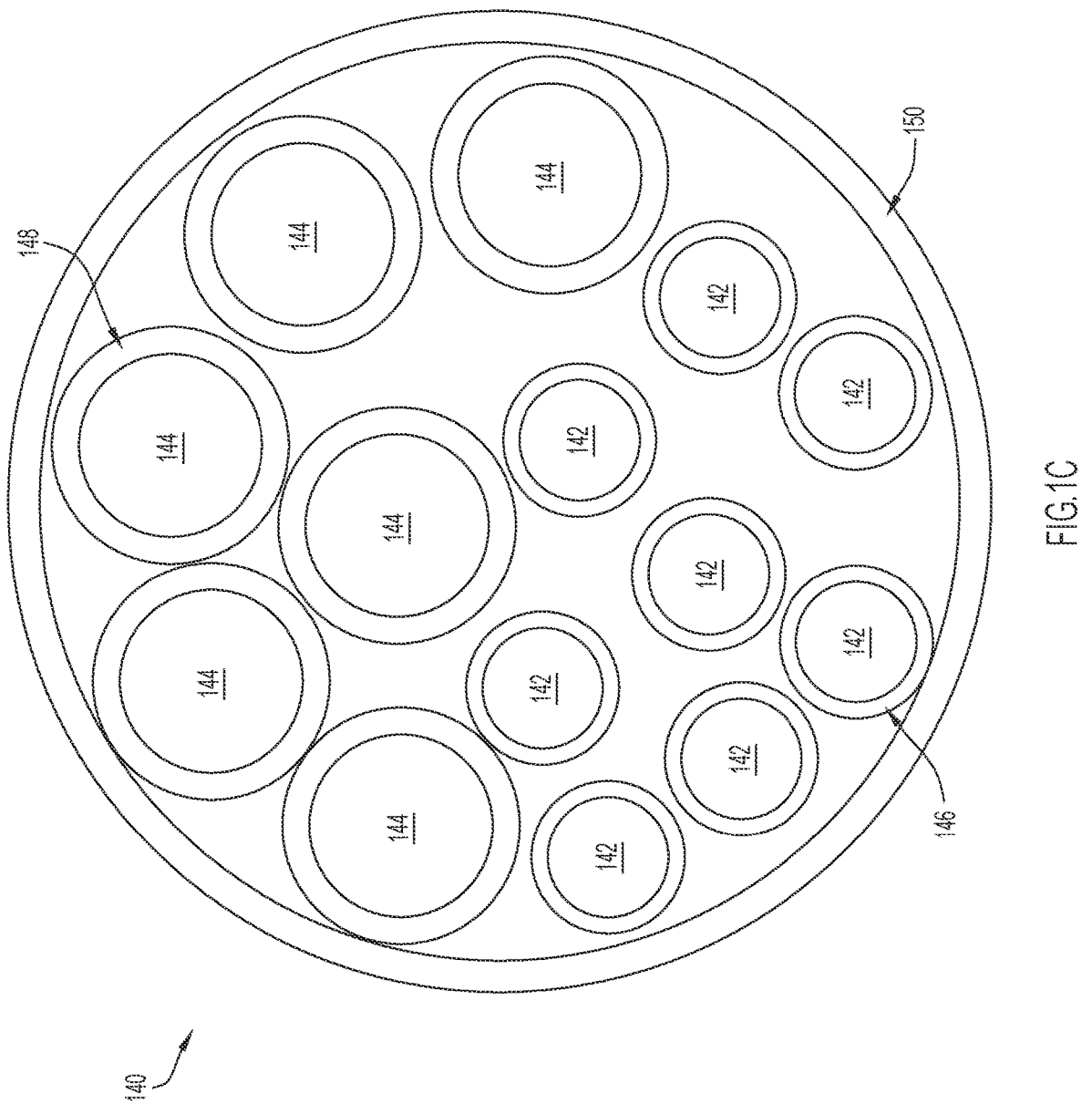
FIG. 1C is a cross section view of a network cable, according to an example embodiment.

FIG. 1C shows a cross section view of an example network cable 140 which can be used for the network cable 104 depicted in FIG. 1A. The network cable 140 can include data lines 142 and power lines 144. The data lines 142 are wires that terminate at and are connected to the set of data pins 106 and that carry the data signals to and from a device, such as the device 122 shown in FIG. 1B. The power lines 144 are wires that terminate at and are connected to the set of power pins 108 and that carry the electrical power to a device such as the device 122. Each of the data lines 142 can be wrapped in insulation 146 and each of the power lines 144 can be wrapped in insulation 148. The insulation 146 and 148 can be of sufficient thickness to prevent the electrical power carried by the power lines 144 from causing voltage breakdown or interference with the data signals carried by the data lines 142 and the power carried by the power lines 144. The network cable 140 can be wrapped in insulation 150 that also can serve to wrap the data lines 142 and the power lines 144 into one bundle of wires. The network cable 140 combines power lines and data lines and therefore can be used to replace both a power cable and a network cable that only carries data lines. The network cable 140 that combines power lines and data lines can be referred to as a hybrid cable.

Figure 1D:
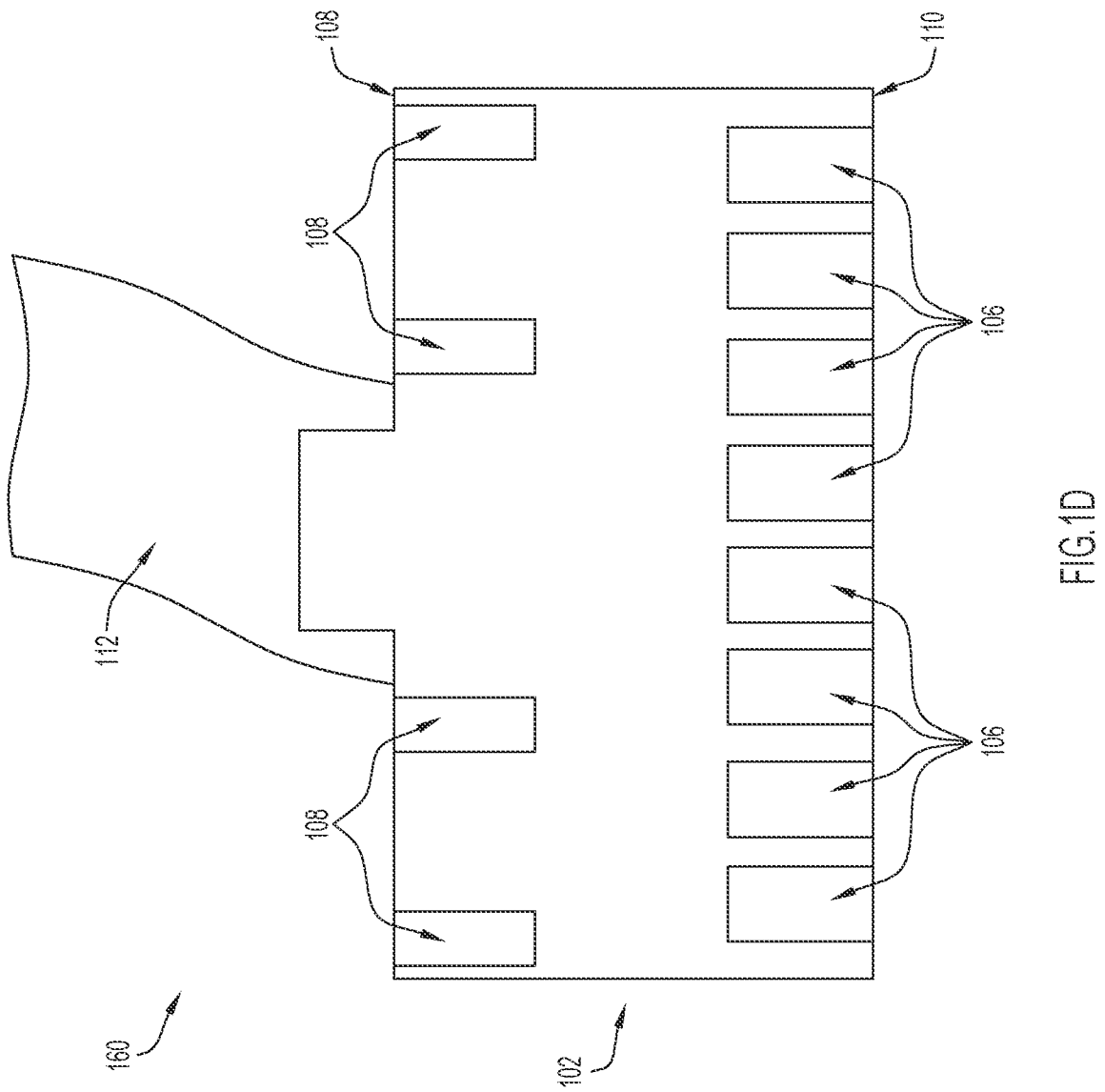
FIG. 1D is a block diagram of an example apparatus that includes a connector with four power pins and a network cable, according to an example embodiment.
Figure 1E:
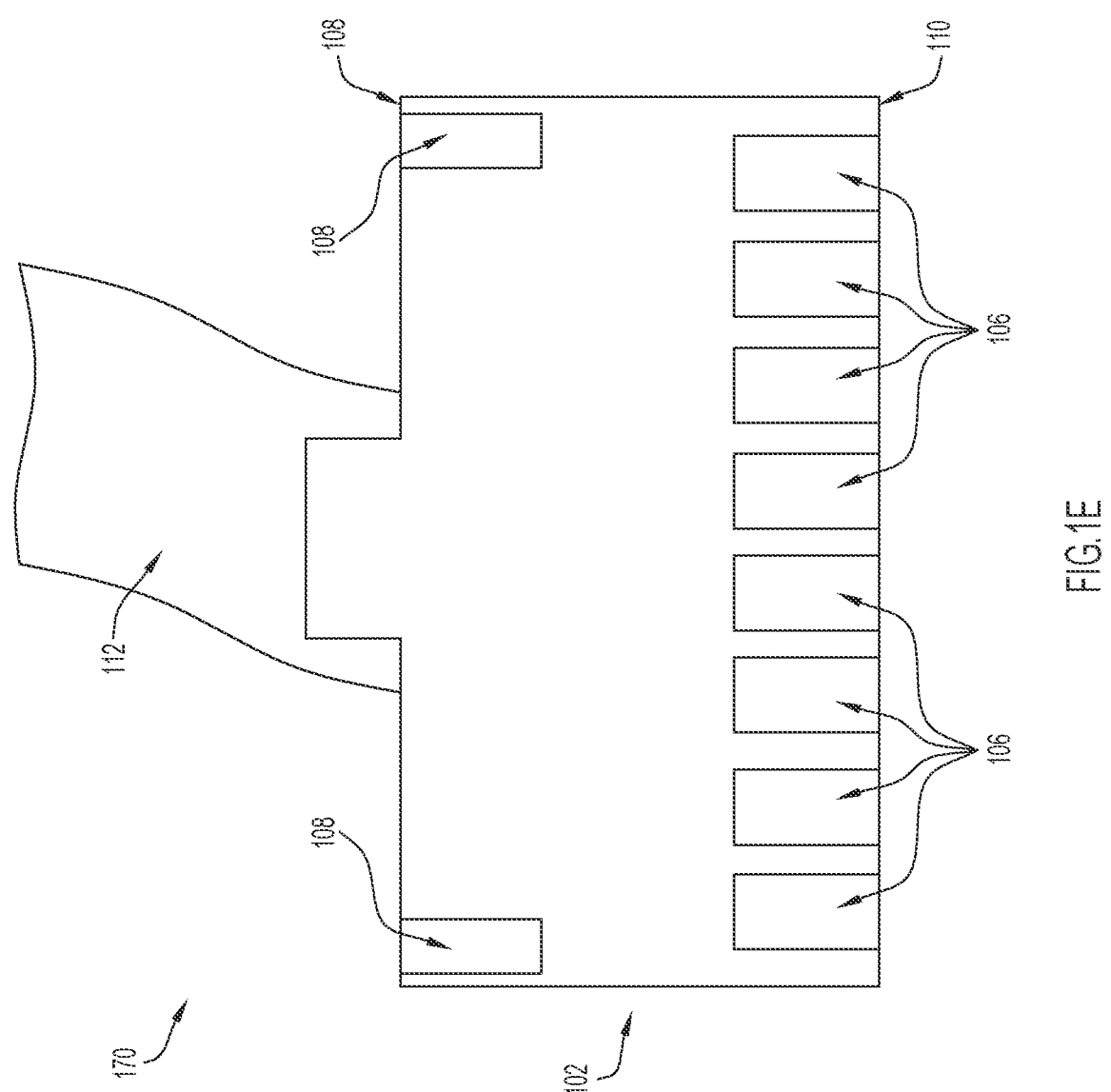
FIG. 1E is a block diagram of an example apparatus that includes a connector with two power pins and a network cable, according to an example embodiment.

FIG. 1D shows an example apparatus 160 in which the set of power pins 108 includes four pins or two sets of two pairs of pins. FIG. 1E shows an example apparatus 170 in which the set of power pins 108 includes two pins or one pair of pins. FIGS. 1D and 1E are provided to show different example implementations in which the number of power pins may vary. The fewer power pins that are included in the set of power pins 108, the greater the distance between adjacent power pins can be employed. For example, apparatus 170 depicts two power pins included in the set of power pins 108 that are spaced into opposite corners of the connector 102. This maximizes the distance between the two adjacent power pins and thus voltage breakdown between the two adjacent power pins can be avoided.

Figure 1F:
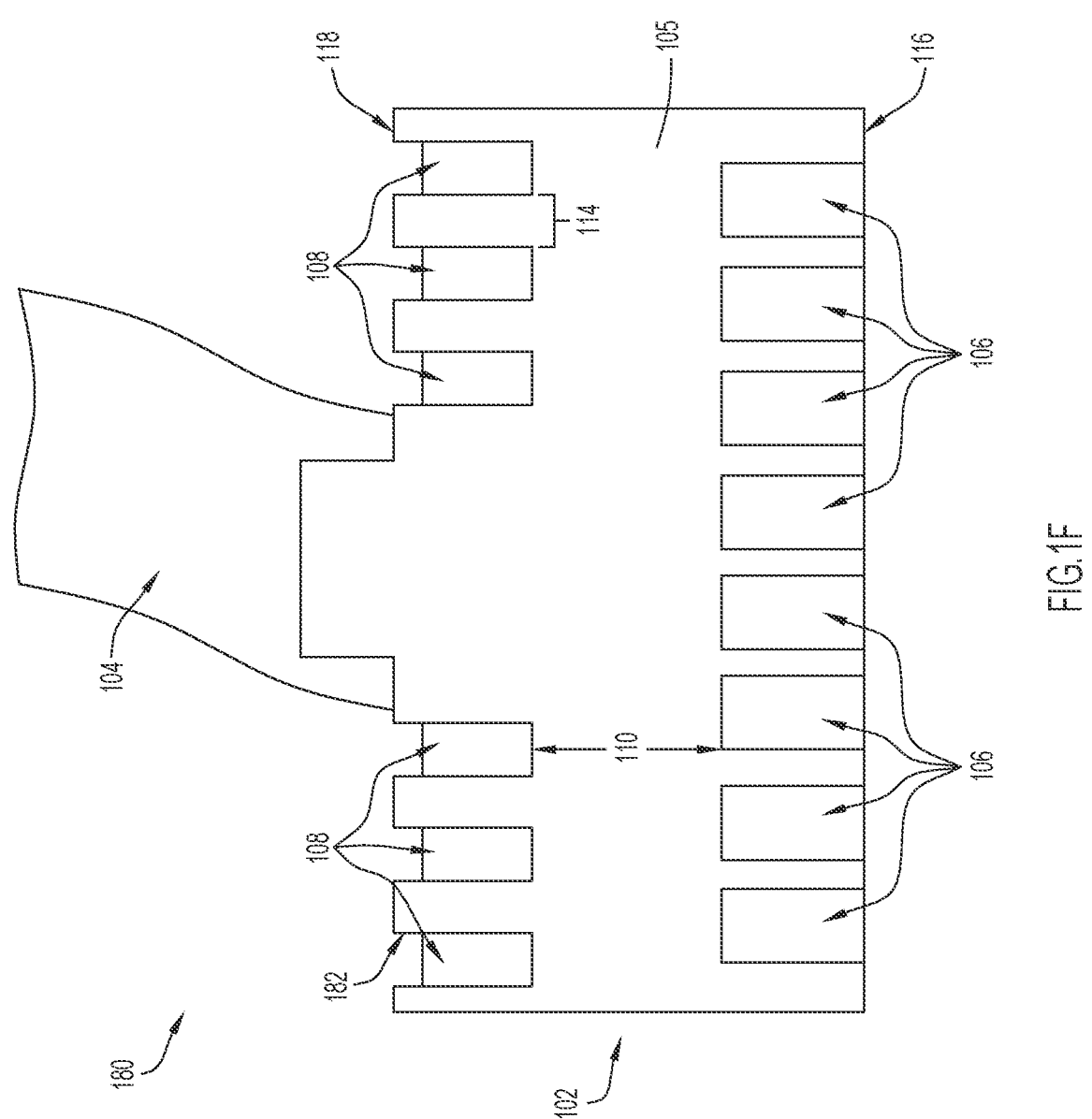
FIG. 1F is a block diagram of an example apparatus that shows the set of power pins recessed into the housing of the network cable, according to an example embodiment.

FIG. 1F shows an example apparatus 180 in which the set of power pins 108 have been recessed below the second surface 118. Recessing the set of power pins 108 allows for vertical surfaces of the connector housing 105 to be exposed. For example, a vertical surface 182 can be exposed. Recessing the set of power pins 108 with the vertical surfaces of the connector housing 105 exposed increases the surface distance of the connector housing 105 between two adjacent power pins of the set of power pins 108 as compared to two adjacent power pins that are not recessed into the connector housing 105. The increased surface distance increases the clearance between the two adjacent power pins and reduces the likelihood of voltage breakdown or electrical creepage between the two adjacent power pins.

Figure 2A:
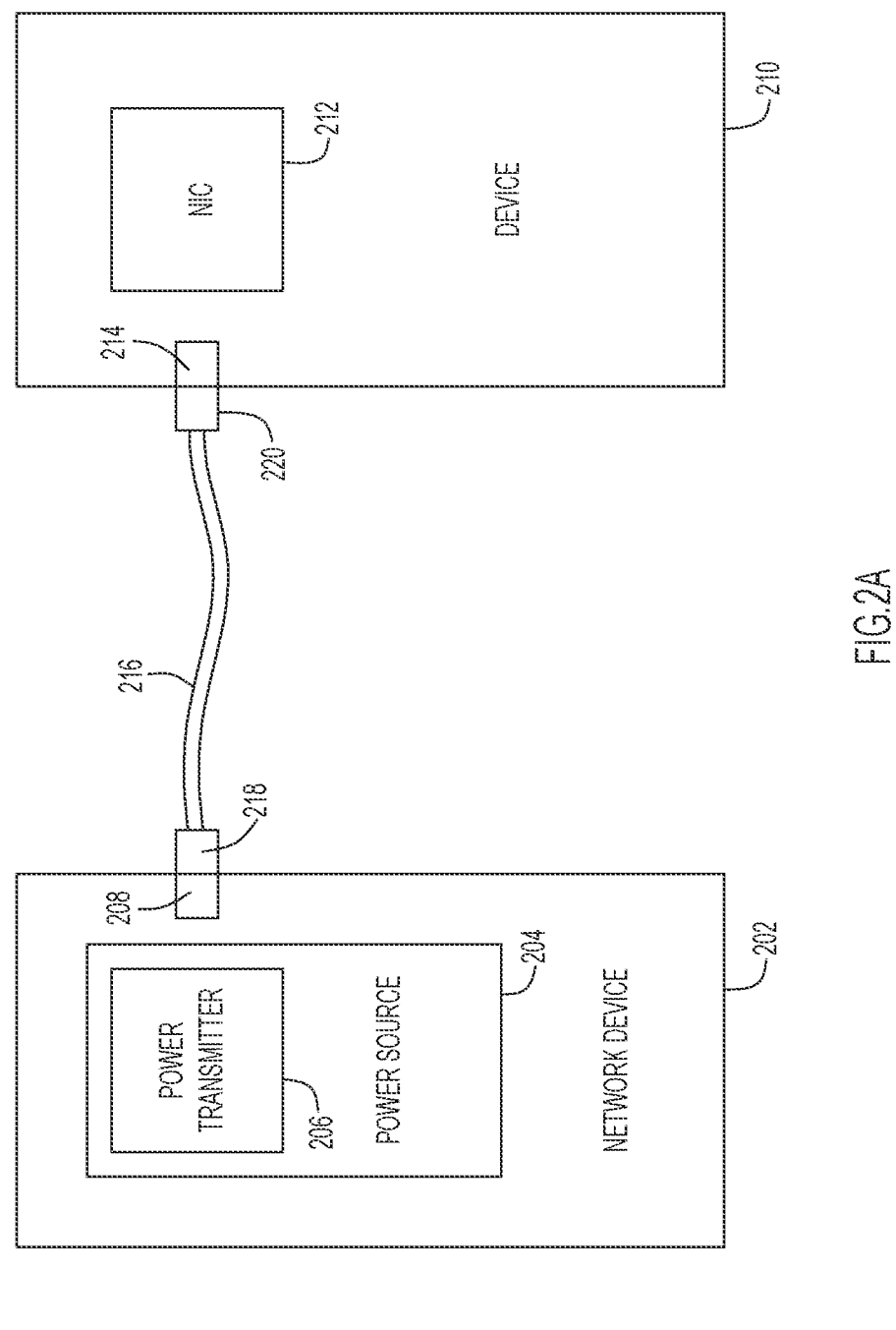
FIG. 2A is a block diagram of an example system with a network device and a device connected via a network cable with connectors according to any of the arrangements depicted in FIGS. 1A-1E, according to an example embodiment.

FIG. 2A shows an example system 200 that includes a network device 202 that can include a power source 204, a power transmitter 206 and a port 208. The system 200 can also include a device 210 with a network interface card (NIC) 212 and a port 214. The network device 202 can be connected to the device 210 via a network cable 216 with connectors 218 and 220.

The network device 202 can be any number of electrical or computing devices including, but not limited to, a server computer, a blade computer, a switch, a top of rack (TOR) switch, a router, etc. The power source 204 can be capable of supplying power over the network cable 216 to the device 210. The power source 204 can supply power to the network device 202. The power transmitter 206 can be a hardware device with circuitry that can control power from the power source 204 that is sent over the network cable 216. For example, the power transmitter 206 can determine the amount of current, as well as voltage or wattage of electricity that is transmitted over the network cable 216. The power transmitter 206 may be capable of sending multi-phase power. The power transmitter 206 can start or stop sending electrical power over the network cable 216 to the device 210. The power transmitter 206 can send power over a portion of the power lines of the network cable 216 and not send power over other power lines. The power transmitter 206 can send power over a first set of power lines of the network cable 216 at a first wattage and also send power over a second set of power lines of the network cable 216 at a second wattage that is different than the first wattage. The power transmitter 206 can send power ranging from 800 to 4000 watts of electricity, for example. In one example, the power transmitter 206 can detect an electrical fault that has occurred and is associated with one of the power lines of the network cable 216 and the power transmitter 206 can terminate power or reduce power that is sent over the given power line in response to the fault detection. The power transmitter 206 can be capable of managing power sent to the device 210 from a location remote to the device 210 using techniques referred to as fault managed power (FMP). FMP can terminate transmission of the power upon detecting a fault on the network cable 216.

The ports 208 and 214 can have the same capabilities and features of port 124 of FIG. 1B and the connectors 218 and 220 can have the same capabilities and features of connector 102 of FIG. 1A. The network cable 216 can have the same capabilities and features of the network cable 104 of FIG. 1A and network cable 140 of FIG. 1C. It should be appreciated that there may be a patch or patch panel in between the network device 202 and the device 210 that interrupts the network cable 216. The patch or patch panel can employ multiple ports and connectors that have pins that carry data and pins that carry power in the various configurations presented herein.

The device 210 can be the same as and have the same features and capabilities as that of device 122 of FIG. 1B. For example, the device 210 can be a server computer, a blade computer, a switch, a top of rack (TOR) switch, a router, a network node, a desktop computer, a laptop computer, etc. The NIC 212 of the device 210 can also be referred to as a network adapter that can provide network connectors for the device 210. The NIC 212 can transmit and receive data signals, via the data pins of the connectors, at a physical layer and deliver data packets at a network layer. The NIC 212 can act as a middleman between a computer/server and a data network.

Figure 2B:
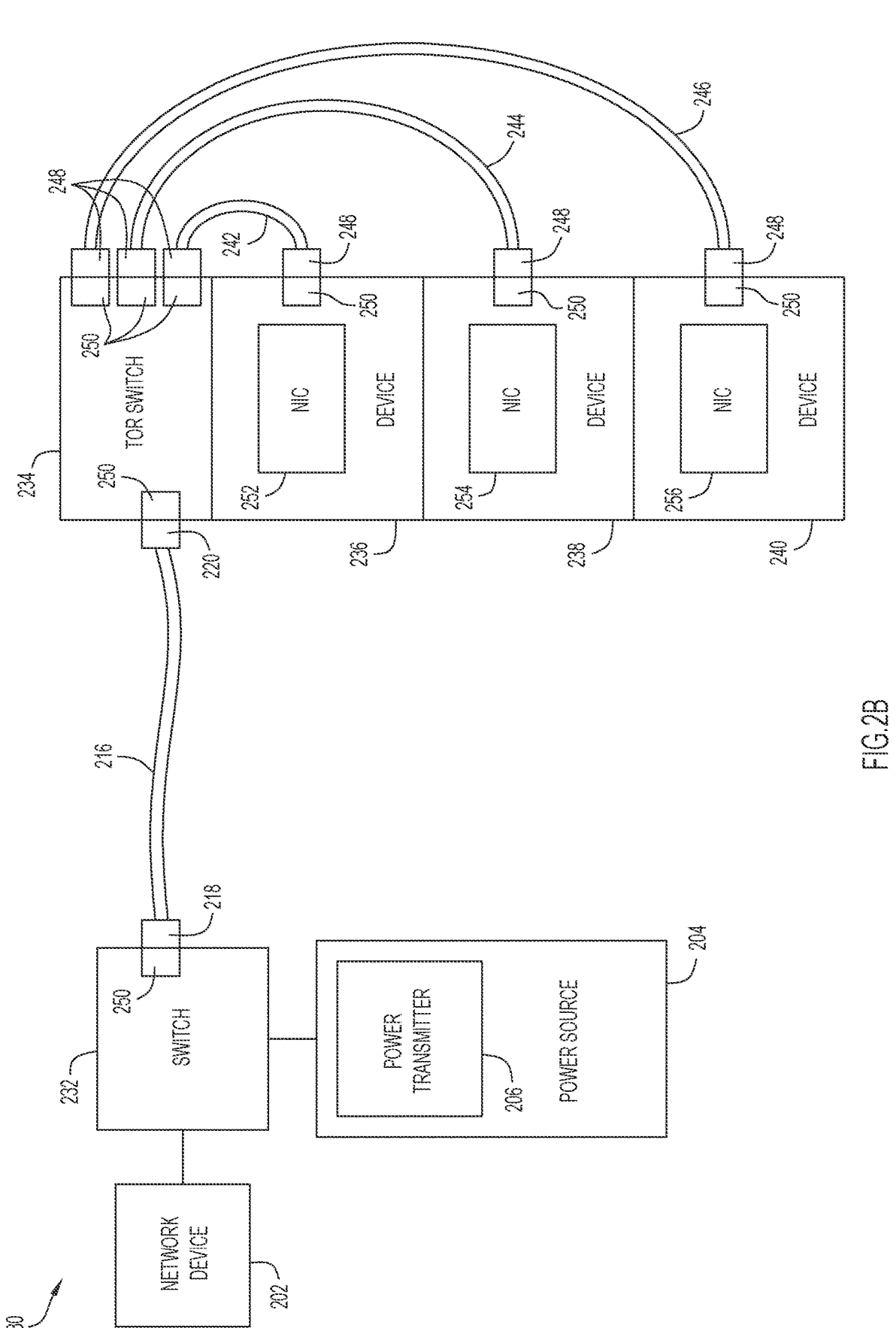
FIG. 2B is a block diagram of an example system with a switch and a plurality of devices connected via network cables with connectors according to any of the arrangements depicted in FIGS. 1A-1E, according to an example embodiment.

FIG. 2B shows an example system 230 that includes a network device 202 that is physically separate from the power source 204 and the power transmitter 206. A switch 232 can be a network switch capable of connecting to multiple network devices, and can be connected to the network device 202, the power source 204 and a TOR switch 234. The TOR switch 234 can be connected to devices 236, 238, and 240 via network cables 242, 244, and 246. The network cables 242, 244, and 246 can each include connectors 248 of the embodiments/capabilities presented herein (e.g., as connector 102 of FIG. 1A) and are capable of interfacing with ports 250. The power transmitter 206 can control power sent through the switch 232 over the network cable 216 to the TOR switch 234, and ultimately to the devices 236, 238, and 240. Data signals sent between the network device 202 and the devices 236, 238, and 240 can be sent over the network cables 242, 244, and 246 using the connectors of the present embodiments. Devices 236, 238, and 240 can each include a NIC 252, 254, and 256, respectively, for sending and receiving data.

Figure 2C:
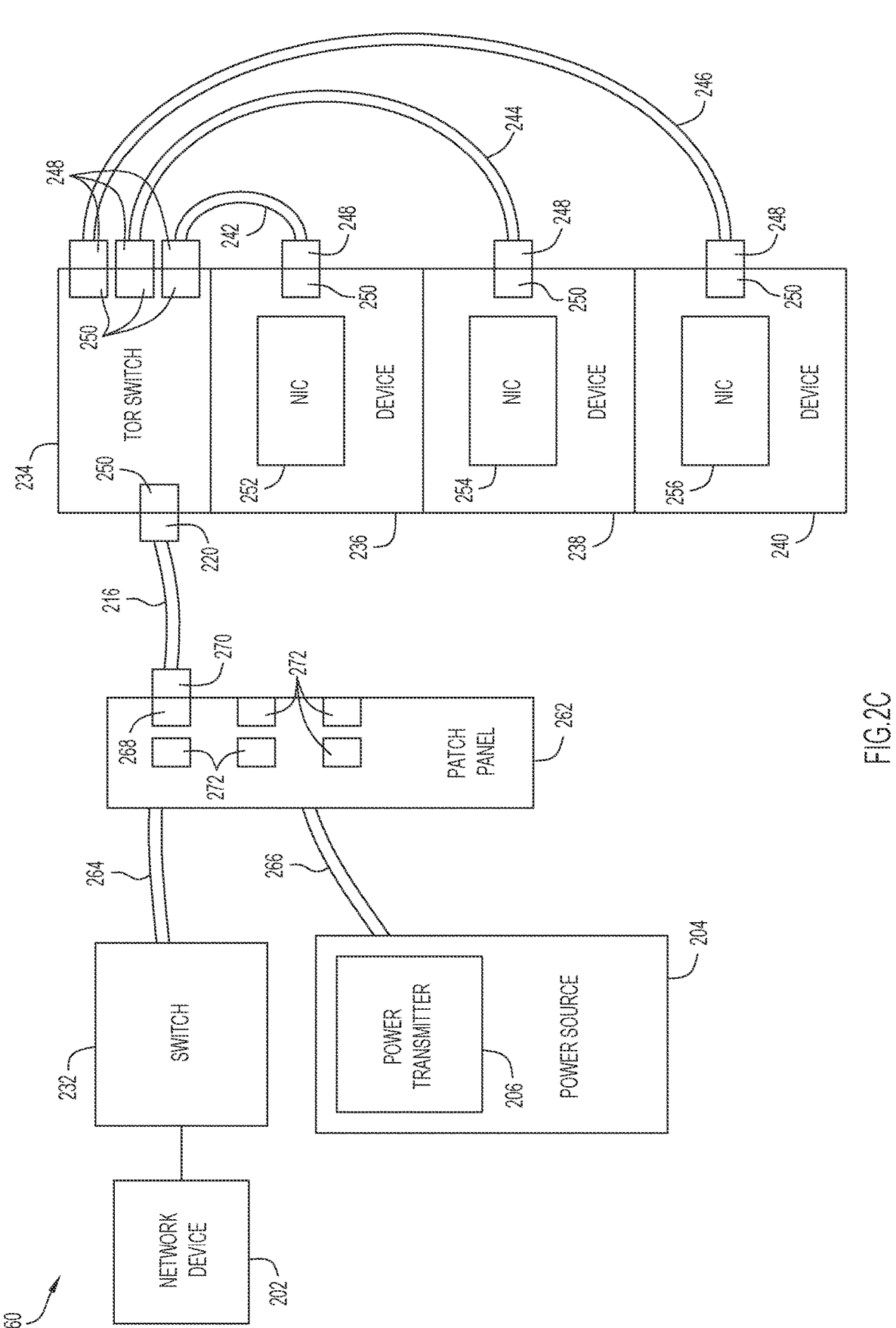
FIG. 2C is a block diagram of an example system with a switch, a patch panel, and a plurality of devices connected via network cables with connectors according to any of the arrangements depicted in FIGS. 1A-1F, according to an example embodiment.

FIG. 2C shows an example system 260 that includes a patch panel 262 that connects the TOR switch 234 to the switch 232 and the power source 204. The switch 232 and the power source 204 can be separate from one another and not directly connected. The switch 232 can be connected to the patch panel 262 via a data cable 264. The data cable 264 may be a network cable such as an ethernet cable. The data cable 264 may not be the same as the network cable 216 of the present technology and the data cable 264 may not be capable of carrying the same higher wattage or voltage power of the network cable 216. The power source 204 can be connected to the patch panel 262 via a power cable 266. The power cable 266 may not carry data to the patch panel 262. The patch panel 262 can send data received via the data cable 264 and the higher power from the power cable 266 to the TOR switch 234 via the network cable 216. Thus, the network cable 216 can be a hybrid cable that replaces the need to employ both a data cable and a power cable from the patch panel 262 to the TOR switch 234. The network cables 242, 244, and 246 can also carry data and higher power to the devices 236, 238, and 240 without using separate data and power cables. The patch panel 262 can have a port 268 of the present technology that can receive a connector 270 associated with the network cable 216. The patch panel 262 can have a plurality of ports 272 of the present technology for connecting the patch panel 262 to multiple devices such as TOR switches or other computing devices.

Figure 2D:
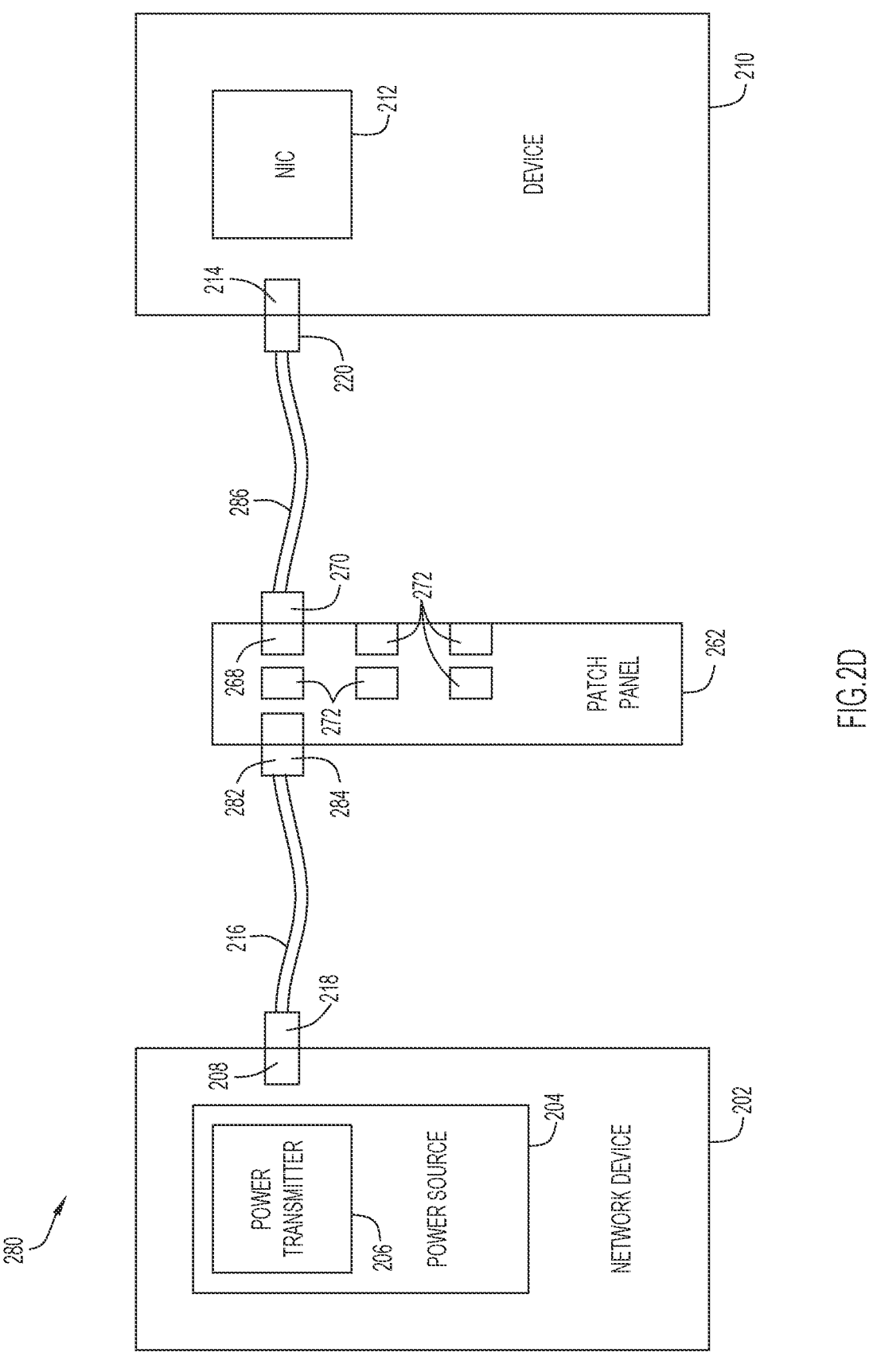
FIG. 2D is a block diagram of an example system with two network cables that form a multi-segmented network cable, according to an example embodiment.

FIG. 2D shows an example system 280 that includes the patch panel 262 between the network device 202 and the device 210. The network device 202 is connected to the patch panel 262 via the network cable 216. The network cable 216 is connected to a port 282 of the patch panel 262 via connector 284. The patch panel 262 is connected to the device 210 via a network cable 286. The network cable 286 can have the same capabilities of carrying data and power as the network cable 216. The ports 208, 214, 268, and 282 can each be ports of the present technology capable of carrying data and power. The connectors 218, 220, 270, and 284 can each be connectors of the present technology capable of carrying data and power.

The example system 280 shows the network device 202 connected to the device 210 via two network cables that each employ connectors of the present technology. The two network cables together, e.g. network cables 216 and 286, can be described as one multi-segment network cable. It should also be appreciated that examples of present technology can include connecting two devices, such as the network device 202 connected to the device 210, via any number of network cables and connectors of the present technology to provide one multi-segment network cable. In other words, the present technology may be applied at each and any connector in a multi-segment network cable.

In some aspects, the techniques described herein relate to an apparatus including: a network cable; and a connector at an end of the network cable, the connector configured to mate with a port in a device, the connector including: a set of data pins for connecting data wires in the network cable to the port; and a set of power pins for connecting power wires in the network cable to the port, wherein the set of power pins carry a higher electrical power than that carried by the set of data pins, and wherein a first spacing between adjacent power pins in the set of power pins has at least a minimum distance to reduce voltage breakdown between the adjacent power pins in the set of power pins.

Multi-Pin Network Cable Connector Aspects

In some aspects, the techniques described herein relate to an apparatus, wherein the first spacing between adjacent power pins in the set of power pins is greater than a second spacing between adjacent data pins in the set of data pins.

In some aspects, the techniques described herein relate to an apparatus, wherein the minimum distance is 1 millimeter of spacing per 1 kilovolt of electricity carried by the set of power pins.

In some aspects, the techniques described herein relate to an apparatus, wherein the connector is based on a Register Jack 45 (RJ45) form factor.

In some aspects, the techniques described herein relate to an apparatus, wherein the set of power pins are configured to carry 800-4000 watts of electricity.

In some aspects, the techniques described herein relate to an apparatus, wherein the set of power pins are configured to carry multi-phase power.

In some aspects, the techniques described herein relate to an apparatus, wherein the set of data pins are configured to not deliver power to the port.

In some aspects, the techniques described herein relate to an apparatus, wherein a portion of the set of power pins are configured to carry electricity and a second portion of the set of power pins do not carry electricity.

In some aspects, the techniques described herein relate to an apparatus, wherein the set of power pins includes 2 to 6 pins.

In some aspects, the techniques described herein relate to an apparatus, wherein the set of data pins includes 8 pins.

In some aspects, the techniques described herein relate to an apparatus, wherein the connector includes a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

In some aspects, the techniques described herein relate to an apparatus, wherein the set of power pins includes two or more pairs of power pins, and the two or more pairs of the power pins are separated from each other in the second portion of the connector.

In some aspects, the techniques described herein relate to an apparatus, wherein the set of power pins are recessed into a housing of the connector.

In some aspects, the techniques described herein relate to a system including: a device that includes a network interface card and a port; a network cable; a power transmitter coupled to the network cable to transmit power to the device via the network cable; and a first connector at a first end of the network cable, the first connector configured to mate with the port, the first connector including: a set of data pins configured to connect data wires in the network cable to the port; and a set of power pins configured to connect power wires in the network cable to the port, wherein the set of power pins are configured to carry a higher electrical power than that carried by the set of data pins, and wherein a first spacing between adjacent power pins in the set of power pins has at least a minimum distance to reduce voltage breakdown between the adjacent power pins in the set of power pins.

In some aspects, the techniques described herein relate to a system, wherein the first spacing between adjacent power pins in the set of power pins is greater than a second spacing between adjacent data pins in the set of data pins.

In some aspects, the techniques described herein relate to a system, the minimum distance is 1 millimeter of spacing per 1 kilovolt of electricity carried by the set of power pins.

In some aspects, the techniques described herein relate to a system, wherein the first connector is based on a Register Jack 45 (RJ45) form factor.

In some aspects, the techniques described herein relate to a system, wherein the power transmitter is configured to transmit power of 800-4000 watts over the network cable.

In some aspects, the techniques described herein relate to a system, wherein the power transmitter is configured to transmit multi-phase power over the network cable to be received via the set of power pins in the first connector.

In some aspects, the techniques described herein relate to a system, wherein the first connector includes a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

In some aspects, the techniques described herein relate to a system, wherein the set of power pins includes two or more pairs of power pins, and the pairs of the power pins are separated from each other in the second portion of the connector.

In some aspects, the techniques described herein relate to a system, wherein the power transmitter is configured to transmit power using fault managed power techniques whereby the power transmitter terminates transmission of the power upon detecting a fault on the network cable.

In some aspects, the techniques described herein relate to a system, further including: a second device with a second port; a second connector at a second end of the network cable configured to mate with the second port of a second device, the second connector further including: a second set of data pins corresponding to the set of data pins of the first connector; and a second set of power pins corresponding to the set of power pins of the first connector.

In some aspects, the techniques described herein relate to a system, wherein the network cable includes a plurality of network cables that form a multi-segmented network cable to connect the device to the second device.

In some aspects, the techniques described herein relate to a connector configured to be deployed at an end of a network cable, the connector including: a set of data pins for connecting data wires in the network cable to a port of a device; and a set of power pins for connecting power wires in the network cable to the port, wherein the set of power pins are configured to carry a higher electrical power than that carried by the set of data pins, and wherein a first spacing between adjacent power pins in the set of power pins has at least a minimum distance to reduce voltage breakdown between the adjacent power pins in the set of power pins.

In some aspects, the techniques described herein relate to a connector, wherein the first spacing between adjacent power pins in the set of power pins is greater than a second spacing between adjacent data pins in the set of data pins.

In some aspects, the techniques described herein relate to a connector, wherein the minimum distance is 1 millimeter of spacing per 1 kilovolt of electricity carried by the set of power pins.

In some aspects, the techniques described herein relate to a connector, wherein the connector includes a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

Figure 3:
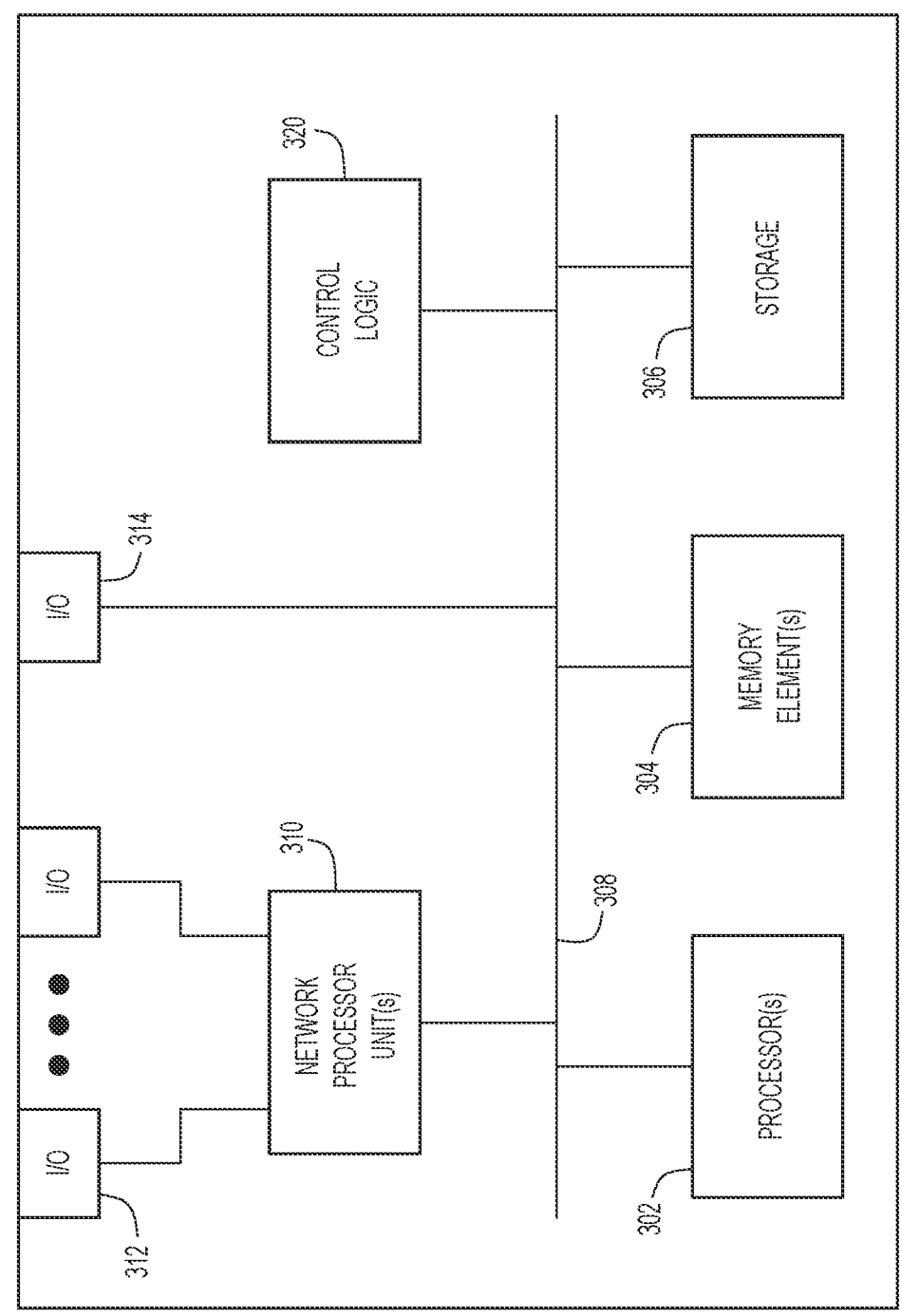
FIG. 3 is a block diagram of a computing or networking apparatus, according to an example embodiment.

FIG. 3 illustrates a hardware block diagram of a device 300 that may perform functions associated with operations discussed herein in connection with the techniques depicted in FIGS. 1A-1F, and 2A-2C. For example, the device 300 can be the device 122 of FIG. 1B, the network device 202 of FIGS. 2A-C, the device 210 of FIG. 2A, or the switch 232, the TOR switch 234, or the devices 236, 238, and 240 of FIG. 2B.

In at least one embodiment, the device 300 may be any apparatus that may include one or more processor(s) 302, one or more memory element(s) 304, storage 306, a bus 308, one or more network processor unit(s) 310 interconnected with one or more network input/output (I/O) interface(s) 312, one or more I/O interface(s) 314, and control logic 320. In various embodiments, instructions associated with logic for device 300 can overlap in any manner and are not limited to the specific allocation of instructions and/or operations described herein. In one example, the network processing unit(s) 310 can be the NICs 212, 252, 254, and 256 of FIGS. 2A-B. In one example, the one or more network I/O interface(s) 312 can be the ports of the present technology such as port 124 of FIG. 1B or ports 250 of FIG. 2B and are configured with contacts to receive the data pins and power pins of the connectors of the present technology.

In at least one embodiment, processor(s) 302 is/are at least one hardware processor configured to execute various tasks, operations and/or functions for device 300 as described herein according to software and/or instructions configured for device 300. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory element(s) 304 (or vice versa), or can overlap/exist in any other suitable manner.

In at least one embodiment, bus 308 can be configured as an interface that enables one or more elements of device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, network processor unit(s) 310 may enable communication between device 300 and other systems, entities, etc., via network I/O interface(s) 312 (wired and/or wireless) to facilitate operations discussed for various embodiments described herein. In various embodiments, network processor unit(s) 310 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 300 and other systems, entities, etc. to facilitate operations for various embodiments described herein. In various embodiments, network I/O interface(s) 312 can be configured as one or more Ethernet port(s), Fibre Channel ports, any other I/O port(s), and/or antenna(s)/antenna array(s) now known or hereafter developed. Thus, the network processor unit(s) 310 and/or network I/O interface(s) 312 may include suitable interfaces for receiving, transmitting, and/or otherwise communicating data and/or information in a network environment.

I/O interface(s) 314 allow for input and output of data and/or information with other entities that may be connected to device 300. For example, I/O interface(s) 314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 320 can include instructions that, when executed, cause processor(s) 302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory element(s) 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein, and in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:

a network cable; and a connector at an end of the network cable, the connector configured to mate with a port in a device, the connector comprising:

a set of data pins for connecting data wires in the network cable to the port; and a set of power pins for connecting power wires in the network cable to the port, wherein the set of power pins comprises two or more pairs of power pins, and the two or more pairs of the power pins are separated from each other, wherein the set of power pins carry a higher electrical power than that carried by the set of data pins, and wherein a first spacing between adjacent power pins in the set of power pins has at least a minimum distance to reduce voltage breakdown between the adjacent power pins in the set of power pins.

2. The apparatus of claim 1, wherein the first spacing between adjacent power pins in the set of power pins is greater than a second spacing between adjacent data pins in the set of data pins.

3. The apparatus of claim 1, wherein the minimum distance is 1 millimeter of spacing per 1 kilovolt of electricity carried by the set of power pins.

4. The apparatus of claim 1, wherein the connector is based on a Register Jack 45 (RJ45) form factor.

5. The apparatus of claim 1, wherein the set of power pins are configured to carry 800-4000 watts of electricity.

6. The apparatus of claim 1, wherein the set of power pins are configured to carry multi-phase power.

7. The apparatus of claim 1, wherein the set of data pins are configured to not deliver power to the port.

8. The apparatus of claim 1, wherein a portion of the set of power pins are configured to carry electricity and a second portion of the set of power pins do not carry electricity.

9. The apparatus of claim 1, wherein the set of power pins includes 2 to 6 pins.

10. The apparatus of claim 1, wherein the set of data pins includes 8 pins.

11. The apparatus of claim 1, wherein the connector comprises a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

12. The apparatus of claim 11, wherein the two or more pairs of the power pins are separated from each other in the second portion of the connector.

13. The apparatus of claim 1, wherein the set of power pins are recessed into a housing of the connector.

14. A system comprising:

a device that includes a network interface card and a port;

a network cable;

a power transmitter coupled to the network cable to transmit power to the device via the network cable; and a first connector at a first end of the network cable, the first connector configured to mate with the port, the first connector comprising:

a set of data pins configured to connect data wires in the network cable to the port; and a set of power pins configured to connect power wires in the network cable to the port, wherein the set of power pins comprises two or more pairs of power pins, and pairs of the two or more pairs of power pins are separated from each other, wherein the set of power pins are configured to carry a higher electrical power than that carried by the set of data pins, and wherein a first spacing between adjacent power pins in the set of power pins has at least a minimum distance to reduce voltage breakdown between the adjacent power pins in the set of power pins.

15. The system of claim 14, wherein the first spacing between adjacent power pins in the set of power pins is greater than a second spacing between adjacent data pins in the set of data pins.

16. The system of claim 14, the minimum distance is 1 millimeter of spacing per 1 kilovolt of electricity carried by the set of power pins.

17. The system of claim 14, wherein the first connector is based on a Register Jack 45 (RJ45) form factor.

18. The system of claim 14, wherein the power transmitter is configured to transmit power of 800-4000 watts over the network cable.

19. The system of claim 14, wherein the power transmitter is configured to transmit multi-phase power over the network cable to be received via the set of power pins in the first connector.

20. The system of claim 14, wherein the first connector comprises a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

21. The system of claim 20, wherein the pairs of the two or more pairs of the power pins are separated from each other in the second portion of the first connector.

22. The system of claim 14, wherein the power transmitter is configured to transmit power using fault managed power techniques whereby the power transmitter terminates transmission of the power upon detecting a fault on the network cable.

23. The system of claim 14, further comprising:

a second device with a second port; and a second connector at a second end of the network cable configured to mate with the second port of a second device, the second connector further comprising:

a second set of data pins corresponding to the set of data pins of the first connector; and a second set of power pins corresponding to the set of power pins of the first connector.

24. The system of claim 23, wherein the network cable comprises a plurality of network cables that form a multi-segmented network cable to connect the device to the second device.

25. A connector configured to be deployed at an end of a network cable, the connector comprising:

a set of data pins for connecting data wires in the network cable to a port of a device; and a set of power pins for connecting power wires in the network cable to the port, wherein the set of power pins comprises two or more pairs of power pins that are separated from each other, wherein the set of power pins are configured to carry a higher electrical power than that carried by the set of data pins, and wherein a first spacing between adjacent power pins in the set of power pins has at least a minimum distance to reduce voltage breakdown between the adjacent power pins in the set of power pins.

26. The connector of claim 25, wherein the first spacing between adjacent power pins in the set of power pins is greater than a second spacing between adjacent data pins in the set of data pins.

27. The connector of claim 25, wherein the minimum distance is 1 millimeter of spacing per 1 kilovolt of electricity carried by the set of power pins.

28. The connector of claim 25, wherein the connector comprises a connector housing, and the set of data pins are located in a first portion of the connector housing along a first surface of the connector housing and the set of power pins are located in a second portion of the connector housing separated from the first portion of the connector housing, along a second surface of the connector housing, wherein the first surface is opposite of the second surface.

* * * * *